(12) United States Patent
Jain et al.

(10) Patent No.: US 11,156,099 B2
(45) Date of Patent: Oct. 26, 2021

(54) TURBINE ENGINE AIRFOIL WITH A MODIFIED LEADING EDGE

(71) Applicant: General Electric Company, Schenectady, NY (US)

(72) Inventors: Nitesh Jain, Bengaluru (IN); Abhijeet Jayshingrao Yadav, Bengaluru (IN); Kishore Budumuru, Bangalore (IN); Nicholas Joseph Kray, Mason, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 585 days.

(21) Appl. No.: 15/471,729

(22) Filed: Mar. 28, 2017

(65) Prior Publication Data
US 2018/0283180 A1    Oct. 4, 2018

(51) Int. Cl.
*F01D 5/14*    (2006.01)
*F15D 1/00*    (2006.01)
*F01D 25/02*    (2006.01)
*F01D 17/16*    (2006.01)

(52) U.S. Cl.
CPC ............. *F01D 5/145* (2013.01); *F01D 25/02* (2013.01); *F15D 1/004* (2013.01); *F01D 17/162* (2013.01); *F05D 2220/36* (2013.01); *F05D 2240/121* (2013.01); *F05D 2240/303* (2013.01); *F05D 2240/31* (2013.01); *F05D 2250/182* (2013.01); *F05D 2250/183* (2013.01); *F05D 2250/184* (2013.01); *F05D 2250/294* (2013.01); *F05D 2250/313* (2013.01); *F15D 1/0035* (2013.01); *Y02T 50/60* (2013.01)

(58) Field of Classification Search
CPC ............... F01D 25/02; F05D 2240/121; F05D 2240/303; F05D 2240/31; F05D 2250/294; F15D 1/004; B64C 11/16
USPC ................. 415/191; 219/200–202, 528, 549
See application file for complete search history.

(56) References Cited

U.S. PATENT DOCUMENTS

| | | |
|---|---|---|
| 4,706,910 A | 11/1987 | Walsh et al. |
| 4,907,765 A | 3/1990 | Hirschel et al. |
| 5,026,232 A | 6/1991 | Savill |
| 5,052,889 A | 10/1991 | Abdel-Messeh |
| 5,069,403 A | 12/1991 | Marentic et al. |
| 5,337,568 A * | 8/1994 | Lee .......................... F01D 5/18 416/236 R |

(Continued)

FOREIGN PATENT DOCUMENTS

| | | |
|---|---|---|
| CA | 2353904 A | 6/2000 |
| EP | 0246916 A1 | 11/1987 |
| WO | 9721907 A1 | 6/1997 |

OTHER PUBLICATIONS

Chinese Patent Office, Office Action re Chinese Patent Application No. 201810265372.5, dated Dec. 26, 2019, 7 pages, China.

*Primary Examiner* — John Kwon
*Assistant Examiner* — Johnny H Hoang
(74) *Attorney, Agent, or Firm* — Venable LLP; Michele V. Frank

(57) ABSTRACT

A turbine engine can comprise a fan section, compressor section, a combustion section, and a turbine section in axial flow arrangement. At least one of the fan section and compressor section can include an airfoil with a leading edge, and a plurality of riblets can be arranged on the leading edge.

25 Claims, 5 Drawing Sheets

(56) References Cited

U.S. PATENT DOCUMENTS

| | | | | |
|---|---|---|---|---|
| 5,489,073 | A * | 2/1996 | Leffel | B64D 15/166 |
| | | | | 244/134 R |
| 5,686,003 | A | 11/1997 | Ingram et al. | |
| 5,846,055 | A | 12/1998 | Brodersen et al. | |
| 6,119,978 | A * | 9/2000 | Kobayashi | B21D 26/055 |
| | | | | 244/134 R |
| 7,373,778 | B2 | 5/2008 | Bunker et al. | |
| 2004/0065092 | A1 * | 4/2004 | Wadia | F01D 25/02 |
| | | | | 60/778 |
| 2013/0134292 | A1 * | 5/2013 | Kray | F01D 5/145 |
| | | | | 249/187.1 |
| 2013/0146217 | A1 * | 6/2013 | Kray | F15D 1/003 |
| | | | | 156/210 |
| 2013/0236322 | A1 | 9/2013 | Schmidt et al. | |
| 2014/0017067 | A1 * | 1/2014 | Stretton | F02C 3/067 |
| | | | | 415/116 |
| 2015/0144112 | A1 * | 5/2015 | Papke | F02B 39/16 |
| | | | | 123/559.1 |
| 2016/0194076 | A1 | 7/2016 | Van Mersteijn | |
| 2017/0036770 | A1 * | 2/2017 | DeRoy | B64D 13/06 |
| 2017/0167510 | A1 * | 6/2017 | Berschback | F01D 5/141 |
| 2017/0298821 | A1 * | 10/2017 | Welch | F02C 7/045 |

\* cited by examiner

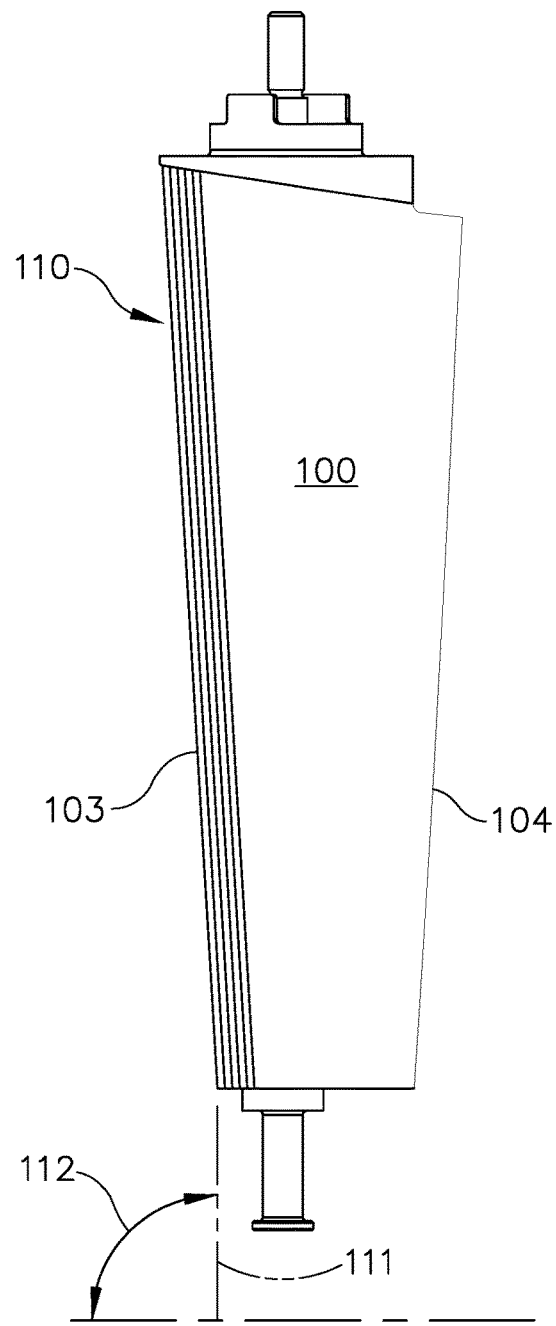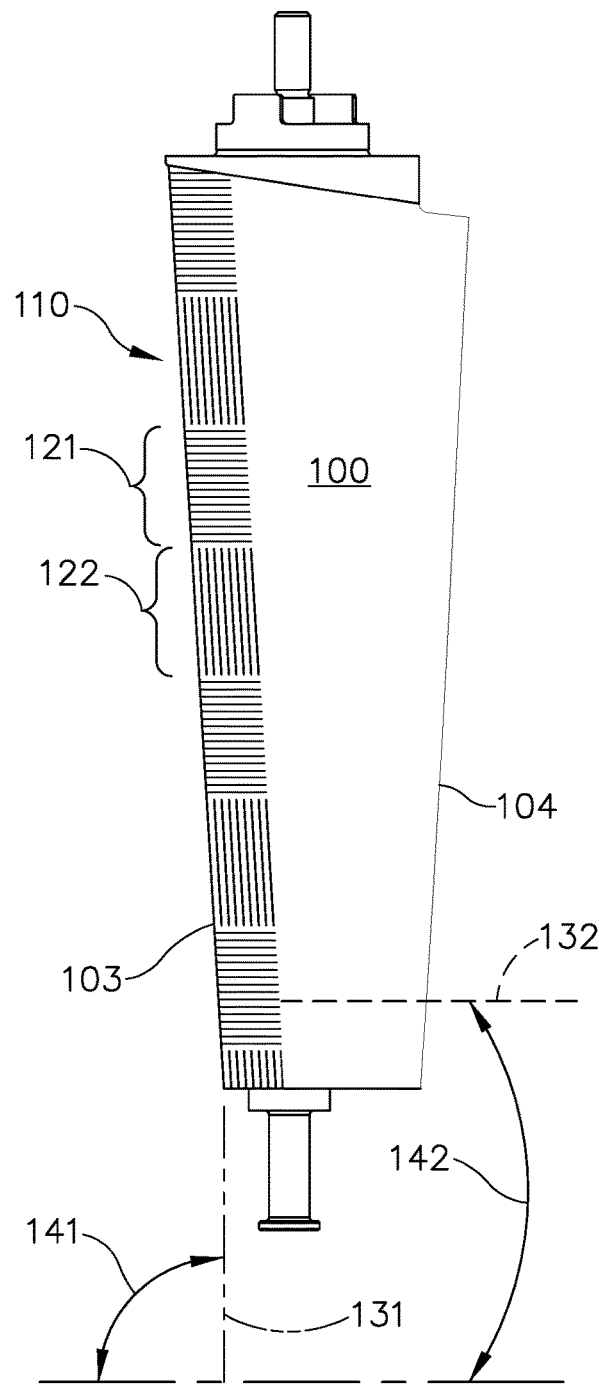

US 11,156,099 B2

TURBINE ENGINE AIRFOIL WITH A MODIFIED LEADING EDGE

BACKGROUND OF THE INVENTION

Turbine engines, and particularly gas or combustion turbine engines, are rotary engines that extract energy from a flow of pressurized combusted gases passing through the engine onto a multitude of rotating turbine blades.

Gas turbine engines for aircraft can accumulate ice near the inlet which can break free during operation. It can be beneficial to limit the amount of ice that can accumulate on a particular component within the engine, or to slow the rate of ice accumulation.

BRIEF DESCRIPTION OF THE INVENTION

In one aspect, a turbine engine can comprise a fan section, compressor section, a combustion section, and a turbine section in axial flow arrangement to define an engine centerline, with at least one of the fan section and compressor section having an airfoil with a leading edge, and a plurality of riblets can arranged on the leading edge to reduce ice accumulation.

In another aspect, an inlet guide vane for a turbine engine can comprise an airfoil with a leading edge, and a plurality of riblets can be provided on the leading edge.

In yet another aspect, a method of retarding ice forming on an airfoil of a turbine engine can comprise flowing air through the turbine engine over riblets on a leading edge of the airfoil.

BRIEF DESCRIPTION OF THE DRAWINGS

In the drawings:

FIG. 7 is a side view of an inlet guide vane in the LP compressor of FIG. 2 including riblets according to a second aspect of the disclosure.

FIG. 8 is a side view of an inlet guide vane in the LP compressor of FIG. 2 including riblets according to a third aspect of the disclosure.

DESCRIPTION OF EMBODIMENTS OF THE INVENTION

Figure 1:
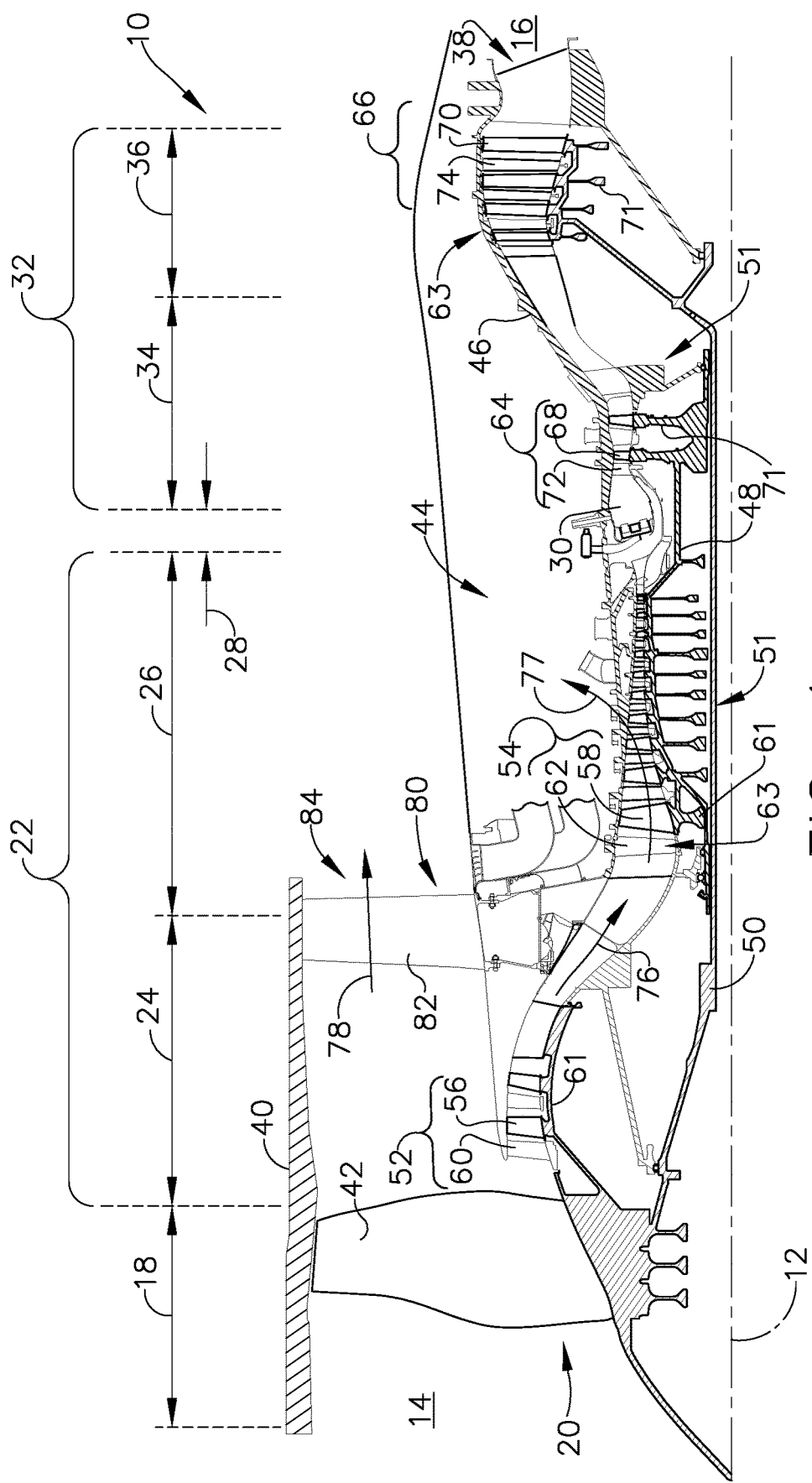
FIG. 1 is a schematic cross-sectional diagram of a turbine engine for an aircraft.

The described embodiments of the present invention are directed to reducing ice accumulation in a turbine engine. For purposes of illustration, the present invention will be described with respect to an inlet guide vane for an aircraft turbine engine. It will be understood, however, that the disclosure is not so limited and may have general applicability within an engine, including rotating and non-rotating airfoils, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
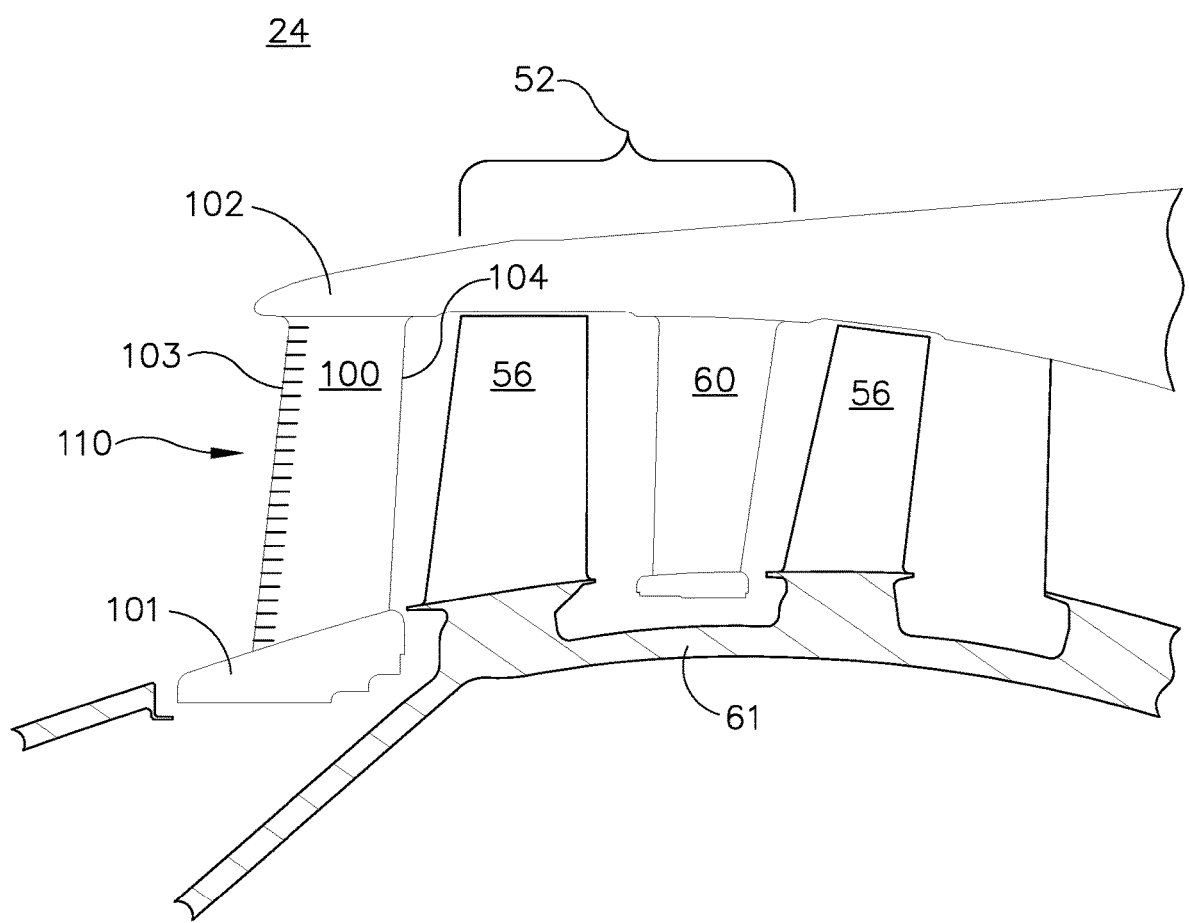
FIG. 2 is a cross-sectional view of a portion of an LP compressor in the turbine engine of FIG. 1 including an inlet guide vane with riblets according to various aspects described herein.

FIG. 2 illustrates a portion of the LP compressor 24 from FIG. 1. An airfoil, illustrated herein as an inlet guide vane 100, extends between an inner band 101 and outer band 102 and has a leading edge 103 and trailing edge 104, which can be included in the compressor 24 adjacent the blade 56 in the LP compressor stage 52. A riblet 110 can be provided at the leading edge 103 of the inlet guide vane 100, and it is contemplated that the riblet 110 can comprise a plurality of riblets 110. As will be described herein, the distribution of riblets 110 arranged at the leading edge 103 can be continuous or have discrete groupings, including the use of the same or different orientations among adjacent groupings of riblets 110. In addition, any grouping or orientation of riblets 110 can be formed in a pre-determined pattern or have a random distribution along the leading edge 103; it is further contemplated that the riblets 110 can also be arranged along at least a portion of the inlet guide vane 100 downstream from the leading edge 103.

It will be understood that while illustrated as the inlet guide vane 100, the airfoil may also comprise any non-rotating vane 60, 62, 72, 74, or any rotating blade 56, 58, 68, 70 within the engine 10, or a rotating blade 42 of the fan 20, or a fan strut or fan outlet guide vane within the engine 10, in non-limiting examples.

Figure 3:
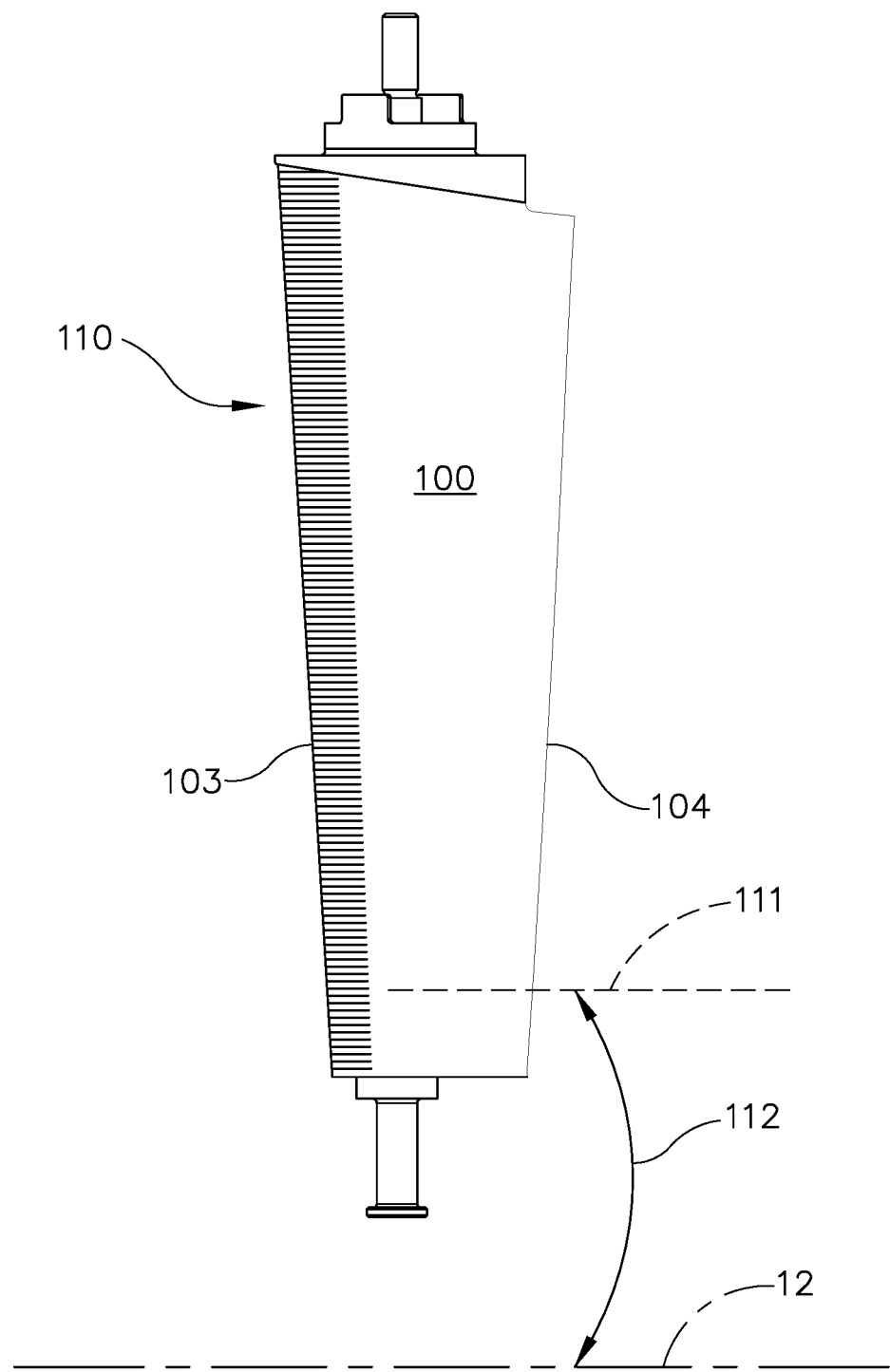
FIG. 3 is a side view of an inlet guide vane in the LP compressor of FIG. 2 including riblets according to a first aspect of the disclosure.

FIG. 3 illustrates a side view of the inlet guide vane 100. The riblets 110 can be continuously provided on the entire leading edge 103 in a direction 111 indicated by the dashed line 111, and the direction 111 of the riblets 110 can form an angle 112 with the engine centerline 12. The angle 112 is illustrated as zero degrees such that the riblets 110 are parallel with the centerline 12; however, the disclosure is not so limited and the angle 112 may be chosen to be any angle advantageous for use in the inlet guide vane 100.

Figure 4:
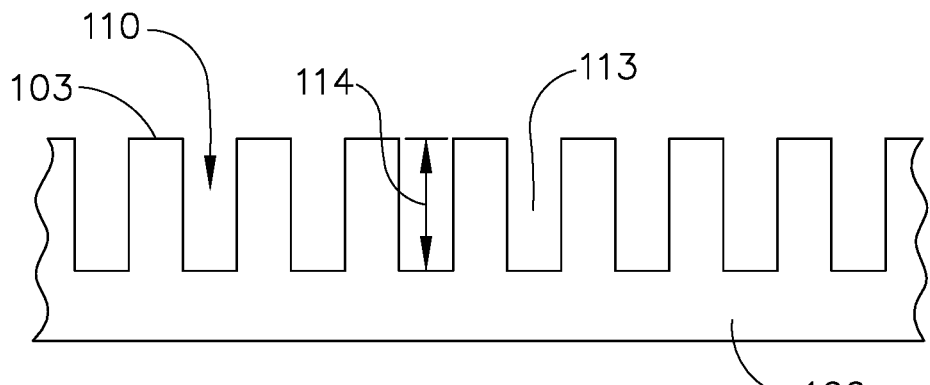
FIG. 4 is an axial view of the riblets of FIG. 3 in a first configuration.

FIG. 4 illustrates an axial view of the riblets 110 from FIG. 3 in a first configuration. A plurality of spaced grooves 113 having a rectangular profile can be provided in the leading edge 103 having a depth 114 into the inlet guide vane 100 as shown. It should be understood that the grooves 113 can have any desired geometrical profile, such as square, triangular, or rounded in non-limiting examples. It is also contemplated in a non-limiting example that the depth 114 of the grooves 113 can be between 0.001 inches and 0.003 inches deep, and further, that the material (such as metal used in the vane 100) between the spaced grooves 113 can define the riblets 110.

Figure 5:
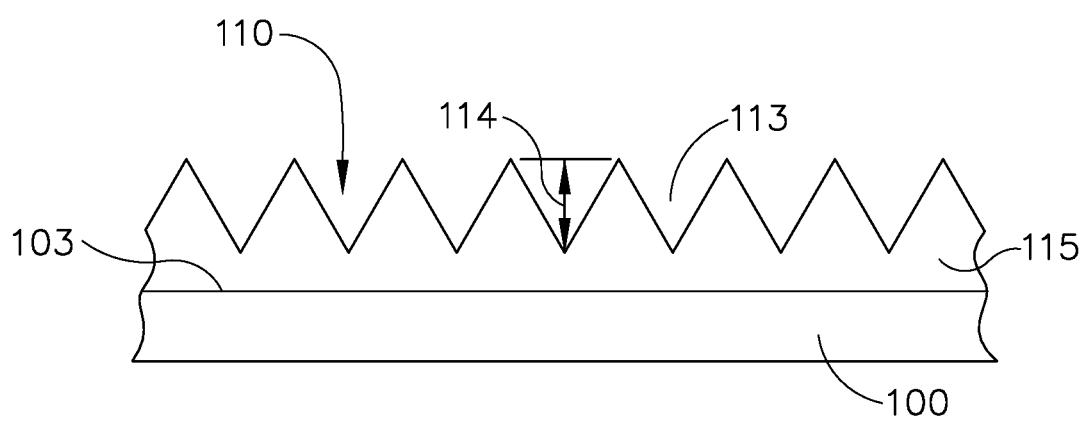
FIG. 5 is an axial view of the riblets of FIG. 3 in a second configuration.

FIG. 5 illustrates a second configuration for the riblets 110. A coating 115 can be provided over at least a portion of the leading edge 103 of the inlet guide vane 100, and the coating 115 may be an oxidation resistant coating, thermal barrier coating, or any other coating of any material useful in the environment of the airfoil such as the inlet guide vane 100. The grooves 113 can be formed having a triangular profile with the depth 114 into the coating 115, preserving the integrity of the surface of the leading edge 103 as shown. The depth 114 is contemplated to be between 0.001 inches and 0.003 inches into the coating 115, and the coating material between the spaced grooves 113 can define the riblets 110 in a manner similar to FIG. 4.

Figure 6:
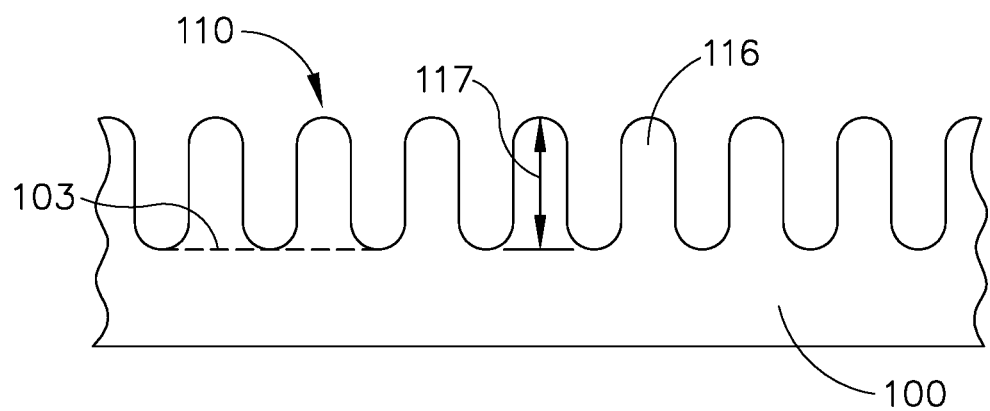
FIG. 6 is an axial view of the riblets of FIG. 3 in a third configuration.

FIG. 6 illustrates a third configuration for the riblets 110. A plurality of spaced protrusions 116 having a rounded profile can be provided on the leading edge 103 of the inlet guide vane 100. The protrusions 116 can extend in the circumferential direction away from the leading edge 103, having a height 117 such that the protrusions 116 can form the riblets 110.

It will be understood that any of the configurations for the riblets 110, such as the grooves 113 or protrusions 116 illustrated in FIGS. 4-6, can have any geometrical profile as desired for use along the leading edge 103.

FIG. 7 illustrates the inlet guide vane 100 having riblets 110 according to a second aspect of the disclosure. The riblets 110 can be provided along the leading edge 103 in the direction 111 to form the angle 112 which can be perpendicular to the engine centerline 12. Alternately, in a non-limiting example the direction 111 of the riblets 110 can be parallel with the leading edge 103 such that the angle 112 may not be exactly 90 degrees with respect to the engine centerline 12, or may be any angle between 0 and 90 degrees as desired. While illustrated along the entire leading edge 103, it is also contemplated that the riblets 110 can cover a portion less than the entirety of the leading edge 103, and further, that the riblets 110 can also be formed in discrete, spaced groups over a portion, or the entirety, of the leading edge 103.

FIG. 8 illustrates the inlet guide vane 100 having riblets 110 according to a third aspect of the disclosure. It is contemplated that a first group of riblets 121 can be formed in a portion of the vane 100 having a first direction 131 that makes a first angle 141 with the engine centerline 12 as shown. In addition, a second group of riblets 122 can be formed having a second direction 132 that forms a second angle 142 with the engine centerline 12. The leading edge 103 can have continuous coverage of riblets in alternating first and second groups 121, 122 as shown; it is contemplated in a non-limiting example that the first angle can be zero degrees and the second angle can be 90 degrees with respect to the engine centerline 10. Other angle measures are contemplated for the first and second angles 141, 142, where the first angle 141 can be different from the second angle 142. In addition, other combinations and groupings are contemplated in the present disclosure including any number of groups having any number of riblet directions, and covering a portion or the entirety of the leading edge 103 with riblets 110.

In operation, air moving through the turbine engine 10 can flow past the inlet guide vane 100 in the direction of the engine centerline 12 (FIG. 3). The air may be carrying water droplets or ice particles which can accumulate on the leading edge 103; as air continues to flow past the vane 100, accumulated ice along the leading edge 103 can break free and strike downstream engine components such as the blade 56 or vane 60 (FIG. 1). A method of retarding ice forming on an airfoil such as the inlet guide vane 100 of the turbine engine 10 can comprise flowing air through the engine 10 over the riblets 110 on the leading edge 103. Air can flow in the same direction as the engine centerline 12 and flow parallel to all of the riblets 110 (FIG. 3), perpendicularly to all of the riblets 110 (FIG. 7), or parallel to the first group of riblets 121 and also perpendicularly to the second group of riblets 122 (FIG. 8). In addition, the airfoil may be stationary (as in the vane 100), or the airfoil may rotate (as in the blade 56), while the air flows through the engine 10.

The riblets 110, or first and second groups of riblets 121, 122, can limit the buildup of ice along the leading edge 103 such that upon breaking free, the size of the liberated ice particles can be smaller compared to those liberated from traditional airfoils in turbine engines. It can be appreciated that such a reduction in particle size can limit or prevent damage to downstream components that may experience collisions with said ice particles. In addition, limiting the amount of ice collected on engine components can reduce the added weight to the engine 10, as well as improve local airflow around the airfoil to which riblets 110 have been added, which can improve engine efficiency.

It should be understood that application of the disclosed design is not limited to turbine engines with fan and booster sections, but is applicable to turbojets and turboshaft engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine comprising:
   a fan section,
   a compressor section,
   a combustion section, and
   a turbine section in axial flow arrangement to define an engine centerline, with at least one of the fan section and the compressor section having an airfoil with an outer surface extending from a leading edge to a trailing edge, and
   a plurality of riblets continuously provided a length extending in a first direction along the outer surface of the leading edge of the airfoil at an angle relative to a centerline of the turbine engine, the plurality of riblets being defined by a plurality of spaced grooves in the outer surface, the plurality of grooves having a depth in a second direction perpendicular to the first direction, the length of the plurality of riblets being greater than the depth of the plurality of grooves, the plurality of riblets being exposed to ambient air, the plurality of riblets being configured to reduce ice accumulation along the leading edge of the airfoil.

2. The turbine engine of claim 1, wherein the riblets are provided along the entire leading edge.

3. The turbine engine of claim 1, wherein the airfoil comprises an exterior coating and the plurality of riblets are formed in the coating.

4. The turbine engine of claim 1, wherein a plurality of spaced protrusions are provided on the leading edge and the protrusions form the riblets.

5. The turbine engine of claim 4, wherein the protrusions extend from the outer surface of the airfoil.

6. The turbine engine of claim 5, wherein the protrusions extend 0.001 to 0.003 inches above the outer surface.

7. The turbine engine of claim 1, wherein the angle is zero degrees and the riblets are parallel to the engine centerline.

8. The turbine engine of claim 1, wherein the angle is 90 degrees and the riblets are perpendicular to the engine centerline.

9. The turbine engine of claim 1, wherein not all of the riblets are oriented at the same angle.

10. The turbine engine of claim 9, wherein the riblets are arranged in groups, with each group being oriented at the same angle.

11. The turbine engine of claim 10, wherein one of the groups has riblets oriented at zero degrees and another of the groups has riblets oriented at 90 degrees.

12. The turbine engine of claim 1, wherein the airfoil is at least one of a compressor inlet guide vane, a non-rotating vane of the compressor, a rotating blade of the compressor, a rotating blade of the fan section, a fan strut, a fan outlet guide vane.

13. The turbine engine of claim 1, wherein the airfoil is non-rotating.

14. An inlet guide vane for a turbine engine defined by an engine centerline and comprising:
  an airfoil with an outer surface extending from a leading edge to a trailing edge, and a plurality of riblets continuously provided a length extending in a first direction along the outer surface of the leading edge of the airfoil at an angle relative to a centerline of the turbine engine,
  the plurality of riblets being defined by a plurality of spaced grooves in the outer surface, the plurality of grooves having a depth in a second direction perpendicular to the first direction, the length of the plurality of riblets being greater than the depth of the plurality of grooves, the plurality of riblets being exposed to ambient air, the plurality of riblets being configured to reduce ice accumulation along the leading edge of the airfoil.

15. The inlet guide vane of claim 14, wherein the angle is zero degrees and the riblets are parallel to the engine centerline.

16. The inlet guide vane of claim 14, wherein the angle is 90 degrees and the riblets are perpendicular to the engine centerline.

17. The inlet guide vane of claim 14, wherein not all of the riblets are oriented at the same angle.

18. The inlet guide vane of claim 17, wherein the riblets are arranged in groups, with each group being oriented at the same angle.

19. The inlet guide vane of claim 18, wherein one of the groups has riblets oriented at zero degrees and another of the groups has riblets oriented at 90 degrees.

20. A method of retarding ice forming on an airfoil of a turbine engine, the method comprising:
  flowing an ambient air through the turbine engine over a plurality of riblets continuously provided a length extending in a first direction along an outer surface of a leading edge of the airfoil at an angle relative to a centerline of the turbine engine, the plurality of riblets being defined by a plurality of spaced grooves in the outer surface, the plurality of grooves having a depth in a second direction perpendicular to the first direction, the length of the plurality of riblets being greater than the depth of the plurality of grooves, the plurality of riblets being configured to reduce ice accumulation from the ambient air along the leading edge of the airfoil.

21. The method of claim 20, wherein the ambient air is flowed parallel to at least some of the riblets.

22. The method of claim 20, wherein the ambient air is flowed perpendicularly to at least some of the riblets.

23. The method of claim 20, wherein the ambient air is flowed parallel to at least some of the riblets and perpendicularly to at least some of the riblets.

24. The method of claim 20, wherein the airfoil is not rotated during the flowing of the ambient air.

25. The method of claim 20, wherein the airfoil is rotated during the flow of the ambient air.

* * * * *